W. R. GARDNER.
SAW FILING MACHINE.
APPLICATION FILED DEC. 28, 1918. RENEWED JAN. 26, 1920.
1,335,433.
Patented Mar. 30, 1920.
2 SHEETS—SHEET 1.
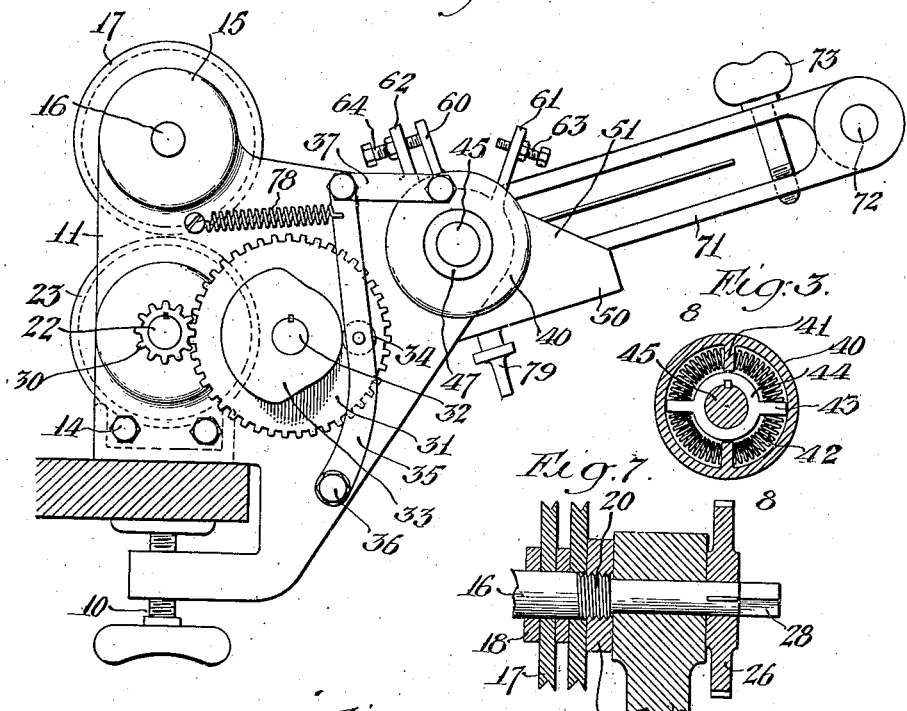
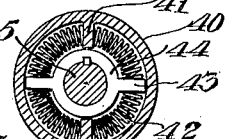
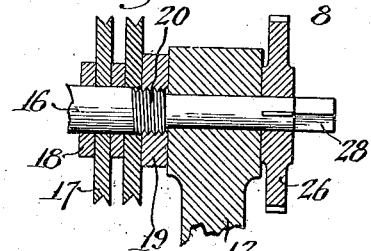
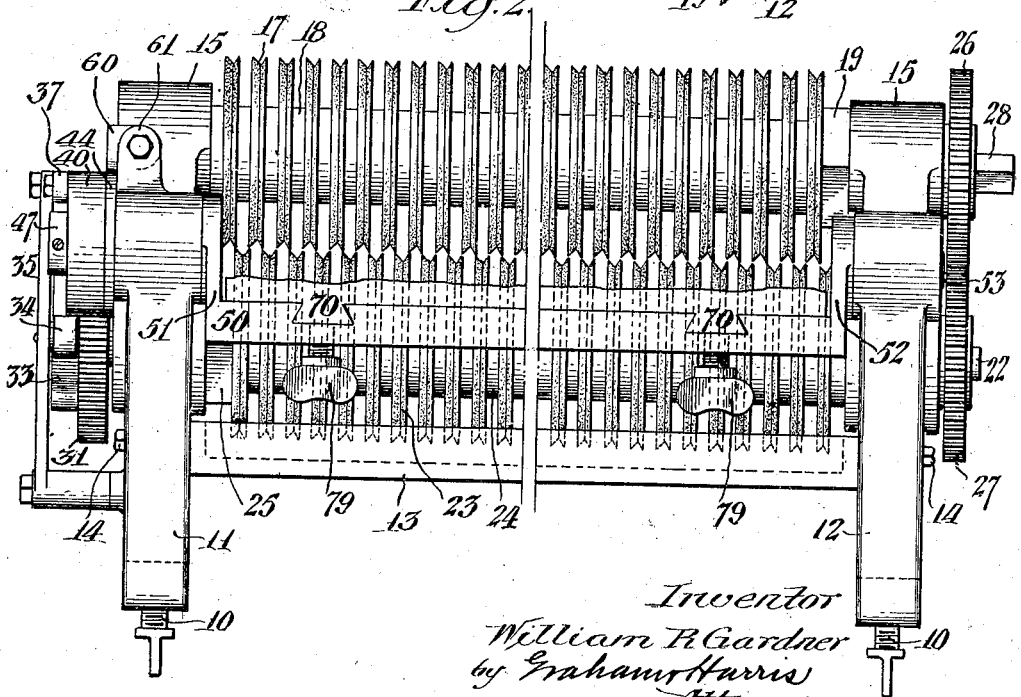
Inventor
William R. Gardner
by Graham & Harris
Attorneys.

W. R. GARDNER.
SAW FILING MACHINE.
APPLICATION FILED DEC. 28, 1918. RENEWED JAN. 26, 1920.
1,335,433.
Patented Mar. 30, 1920.
2 SHEETS—SHEET 2.
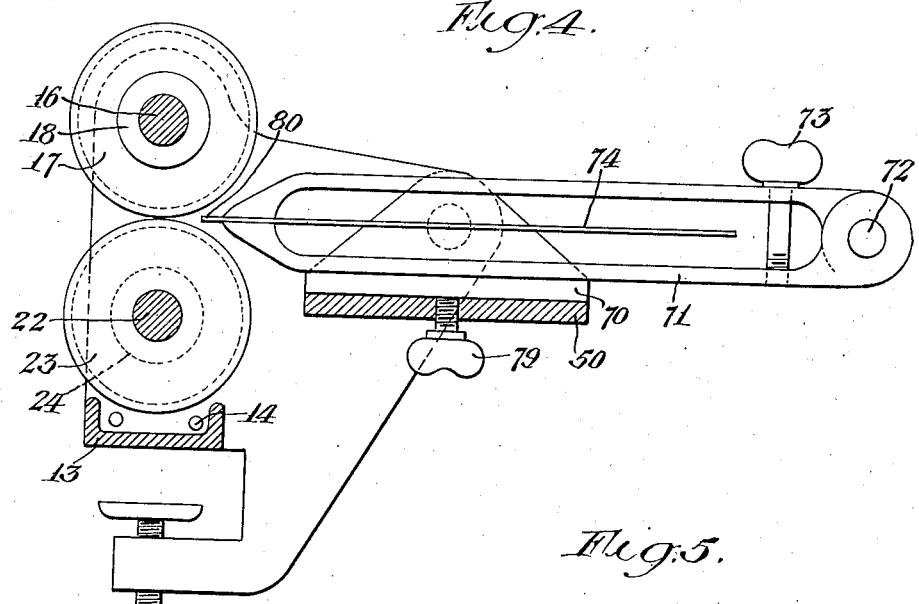
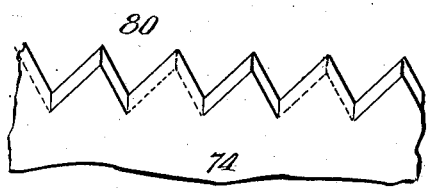
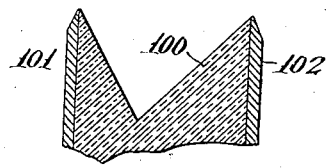
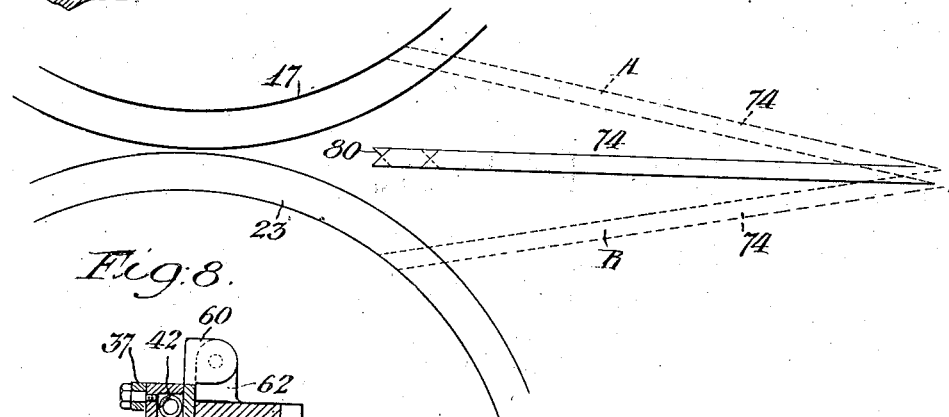
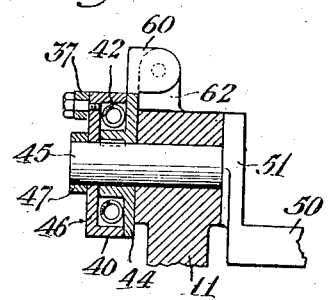
Inventor
William R. Gardner
by Graham Harris
Attorneys

UNITED STATES PATENT OFFICE.

WILLIAM R. GARDNER, OF LOS ANGELES, CALIFORNIA, ASSIGNOR TO M. R. HAMAKER, OF LOS ANGELES, CALIFORNIA.

SAW-FILING MACHINE.

1,335,433.  Specification of Letters Patent.  Patented Mar. 30, 1920.

Application filed December 28, 1918, Serial No. 268,769. Renewed January 26, 1920. Serial No. 354,246.

*To all whom it may concern:*

Be it known that I, WILLIAM R. GARDNER, a citizen of the United States, residing at Los Angeles, in the county of Los Angeles and State of California, have invented a new and useful Saw-Filing Machine, of which the following is a specification.

My invention relates to the art of filing saws and is more particularly a machine in which a plurality of the teeth in the saw are subjected to the filing operation at the same time and in which all the cutting faces of these teeth are operated on at one time. In filing saws by hand it is common to file a single side of a tooth at one time, and after the saw has been filed several times the line of the breast of the teeth assumes an uneven or wavy contour due to the fact that the teeth have been unevenly filed; further the filing of saws by hand is a long and tedious operation which can only be properly done by one who has had considerable experience in that line.

The principal object of my invention is to produce a saw filing machine, of simple form and construction, in which every other tooth throughout the length of the saw is filed alternately with the remaining teeth until the operation is completed, a further object being to produce a machine of the character described which may be operated by unskilled mechanics so that the operation of the filing of the saw may be completed in a very short time compared with the length of time required to file a saw by hand.

Other objects and advantages will appear hereinafter from the following description.

Referring to the drawings which are for illustrative purposes only,

Figure 1 is an end elevation of a machine embodying a form of my invention.

Fig. 2 is a face view of the machine shown in Fig. 1.

Fig. 3 is a vertical sectional view of the elastic driving mechanism.

Fig. 4 is a vertical sectional view of the machine.

Fig. 5 is an enlarged side elevation of a portion of the saw after the filing operation has been completed.

Fig. 6 is an enlarged diagrammatic view of a portion of the cutters and a saw blade showing the operation or movement of the saw during the filing operation.

Fig. 7 is a detail view of one end of the upper shaft 16 showing the manner of mounting the grinding disks thereon.

Fig. 8 is a sectional view on line 8—8, Fig. 3, and

Fig. 9 is a sectional view of a portion of a preferred form of cutter.

The machine as shown in the drawings consists of a frame which is designed to be clamped by means of a screw 10 upon a bench or other suitable support, the frame consisting of two end standards 11 and 12 connected by means of a base plate or channel bar 13, suitable bolts 14 being used for this purpose. Mounted in bearings 15 formed on the standards 11 and 12 is an upper shaft or mandrel 16 upon which is assembled a series of circular cutters 17, the cutters 17 being spaced apart by spacing rings or washers 18 to suit the pitch or number of teeth per inch in the saw. The cutters when set in proper position are clamped on the shaft 16 by means of a nut 19 which engages a threaded portion 20 of the shaft as shown in Fig. 7.

Directly below the shaft 16, mounted in suitable bearings on the standards 11 and 12, is a lower shaft or mandrel 22 upon which is arranged a series of similar circular cutters 23 which are also spaced apart by rings or washers 24, a nut 25 being provided on the shaft 22 in the same manner as that heretofore described on the shaft 16.

One end of the shaft 16 extends through the standard 12 and is provided with a gear 26 which meshes with a gear 27 on the end of shaft 22 whereby the shaft 22 is operated from the shaft 16, turning in the opposite direction, the shaft 16 being operated by means of an ordinary crank, not shown, placed upon the squared end 28 of the shaft 16, it being understood that the shaft 16 may be power driven by any well known connection which may be used for that purpose.

The end of the shaft 22 which extends through the standard 11 is provided with a pinion 30 keyed thereon, which pinion 30 meshes with a gear 31 fixed to a shaft 32 journaled in any suitable manner on the standard 11. Keyed to the shaft 32 is a cam 33 which engages a roller 34 which is journaled upon an arm 35, the lower end of which is pivotally mounted on the standard 11 as indicated at 36. The upper end of the arm 35 is connected by means of a link 37 with a circular driving box 40, said driving box having extending inwardly therefrom webs or fingers 41 which are engaged by coiled compression springs 42, the opposite ends of such springs 42 being engaged by arms 43 which extend outwardly from a hub 44 which is keyed to a shaft 45 journaled in the standard 11 and extending therethrough. The box 40 is formed with an inwardly extending wall 46 which loosely fits over the shaft 45, being held thereon by means of a collar 47.

50 designates a rocking table, the ends 51 and 52 of which extend upwardly, the end 51 being connected to the inner end of the shaft 45 and the end 52 being mounted upon a shaft 53 journaled in the standard 12.

The hub 44 is provided with a projection 60 which extends out over the standard 11 between two projections 61 and 62 which are provided with set screws 63 and 64, these set screws tending to limit the motion of the projection 60 and consequently the extreme angular motion of the shaft 45. Secured by dovetails 70 in the rocking table 50 is a saw clamp 71 which is hinged as shown at 72 and locked in place by a thumb nut 73. The saw 74 is clamped in the saw clamp 71 as shown in Fig. 4.

The method of operation of the invention is as follows:

The shaft or mandrel 16 being turned by means of the squared end 28, the cutters 17 are rotated. The shaft 22 is also rotated through the gears 26 and 27 in the opposite direction to the shaft 16 and the cutters 23 mounted on the shaft 22 are also rotated. The saw 74 is clamped in place in its proper position in the saw clamp 71. The rotation of the shaft 22 rotates the shaft 32 through the pinion 30 and the gear 31, thus rotating the cam 33. This cam moves the lever 35 against the tension of a spring 78 and moves the box 40 back and forth about the shaft 45. This movement of the box 40 is transmitted to the hub 44 through the springs 42, the motion of the hub 44 being limited by the set screws 63 and 64. The movement of the hub 44 is transmitted to the shaft 45 and from the shaft 45 to the rocking table 50 in which the saw clamp 71 is secured by means of a set screw 79. As a result the rocking table oscillates about the center of the shaft 45, the cutting edge 80 of the saw moving up and down. The saw is so adjusted that in its upper position it lies as shown at "A" in Fig. 6 against the cutters 17 and in its lower position it lies as shown at "B" in that figure against the lower cutters 23. The cutters 17 and 23 are each so formed as to cut a complete tooth, that is to say, they are grooved so that each cutter cuts the face and back of one tooth. It will be further noted that the cutters 17 and 23 are staggered with relation to each other, the cutters in each set cutting every other tooth so that alternate teeth will have inclined faces as is necessary if a successful saw is to be produced.

The springs 42 tend to regulate the tension of the saw against the cutters so that a uniform cutting action takes place. The set screws 63 and 64 limit the extreme travel of the saw thus insuring very accurate cutting of the teeth.

The cutters 17 and 23 may be of metal with cutting teeth formed thereon or they may be made as shown in Fig. 9 in which 100 is a grooved emery wheel and 101 and 102 are metal facing disks protecting the edges of the wheel 100 and beveled to clear adjacent teeth to that being cut.

I claim as my invention:—

1. A saw filer comprising standards, a shaft journaled in said standards, a series of cutters mounted on said shaft, means for supporting a saw, and means operated by said shaft for alternately forcing said saw against and withdrawing it from contact with said cutters.

2. A saw filer comprising standards, two parallel shafts journaled in said standards, means for driving said shafts in opposite directions, two series of cutters, each series being mounted on one of said shafts, a saw supporting means, and means for forcing said saw against either of said series of cutters.

3. In a saw filer two parallel shafts, a cutter on each shaft, means for holding a saw with its cutting edge between said cutters, and means for forcing said saw against either cutter.

4. A saw filer comprising standards, two parallel shafts journaled in said standards, two series of cutters, each series being mounted on one of said shafts, the cutters of one series being on planes intermediate to the planes of the cutters of the other series, a rocking table journaled about an axis parallel to said shafts, and means for clamping a saw to said table in such a position that the cutting edge of a saw clamped in place can be forced into contact with either of said series of cutters.

5. A saw filer comprising standards, two parallel shafts journaled in said standards, two series of cutters, each series being mounted on one of said shafts, the cutters of one series being on planes intermediate to the planes of the cutters of the other series, a rocking table journaled about an axis parallel to said shafts, a saw clamp secured to said table, and means for rocking said table in such a manner that the cutting edge of a saw clamped in place can be forced into contact with either of said series of cutters.

6. A saw filer comprising standards, two parallel shafts journaled in said standards, two series of cutters, each series being mounted on one of said shafts, the cutters of one series being on planes intermediate to the planes of the cutters of the other series, a rocking table journaled about an axis parallel to said shafts, a saw clamp, means for adjustably securing said saw clamp to said table, and means for rocking said table about said axis in such a manner as to force the cutting edge of a saw secured in said clamp against first one and then the other of said series of cutters.

7. A saw filer comprising standards, two parallel shafts journaled in said standards, two series of cutters, each series being mounted on one of said shafts, the cutters of one series being on planes intermediate to the planes of the cutters of the other series, a rocking table journaled about an axis parallel to said shafts, a saw clamp, means for adjustably securing said saw clamp to said table, and means automatically actuated by the rotation of said shafts for rocking said table about said axis in such a manner as to force the cutting edge of a saw secured in said clamp against first one and then the other of said series of cutters.

8. A saw filer comprising standards, two parallel shafts journaled in said standards, two series of cutters, each series being mounted on one of said shafts, the cutters of one series being on planes intermediate to the planes of the cutters of the other series, a rocking table journaled about an axis parallel to said shafts, a saw clamp, means for adjustably securing said saw clamp to said table, a cam driven from said shafts, and means driven by said cam for rocking said table about said axis in such a manner as to force the cutting edge of a saw secured in said clamp against first one and then the other of said series of cutters.

In testimony whereof, I have hereunto set my hand at Los Angeles, California, this 17th day of December, 1918.

WILLIAM R. GARDNER.